US011250639B2

(12) United States Patent
Santesteban et al.

(10) Patent No.: US 11,250,639 B2
(45) Date of Patent: Feb. 15, 2022

(54) LEARNING-BASED ANIMATION OF CLOTHING FOR VIRTUAL TRY-ON

(71) Applicant: SEDDI, INC., New York, NY (US)

(72) Inventors: Igor Santesteban, Madrid (ES); Miguel A. Otaduy, Madrid (ES); Dan Casas, Madrid (ES)

(73) Assignee: SEDDI, INC., New York, NY (US)

( * ) Notice: Subject to any disclaimer, the term of this patent is extended or adjusted under 35 U.S.C. 154(b) by 0 days.

(21) Appl. No.: 16/639,923

(22) PCT Filed: Dec. 11, 2019

(86) PCT No.: PCT/US2019/065690
§ 371 (c)(1),
(2) Date: Feb. 18, 2020

(87) PCT Pub. No.: WO2020/131518
PCT Pub. Date: Jun. 25, 2020

(65) Prior Publication Data
US 2021/0118239 A1 Apr. 22, 2021

Related U.S. Application Data

(60) Provisional application No. 62/781,828, filed on Dec. 19, 2018.

(51) Int. Cl.
*G06T 15/00* (2011.01)
*G06T 19/20* (2011.01)
(Continued)

(52) U.S. Cl.
CPC ............ *G06T 19/20* (2013.01); *G06N 3/0445* (2013.01); *G06N 3/08* (2013.01); *G06Q 30/0643* (2013.01);
(Continued)

(58) Field of Classification Search
CPC .... G06T 2200/24; G06T 2210/16; G06T 7/75; G06T 2207/10028; G06T 17/205; A41H 1/02; A41H 1/06
(Continued)

(56) References Cited

U.S. PATENT DOCUMENTS 9,754,410 B2 * 9/2017 Hua ..................... A41H 1/02
10,192,346 B2 * 1/2019 De Goes ............... G06T 15/04
(Continued)

FOREIGN PATENT DOCUMENTS

WO 2019207176 A1 10/2019

OTHER PUBLICATIONS

Guan P, Reiss L, Hirshberg DA, Weiss A, Black MJ. Drape: Dressing any person. ACM Transactions on Graphics (TOG). Jul. 1, 2012;31(4):1-0.*
(Continued)

*Primary Examiner* — Phu K Nguyen
(74) *Attorney, Agent, or Firm* — Marton Ribera Schumann & Chang LLP; Chien-Ju Alice Chuang; Hector J. Ribera (57) ABSTRACT

A learning-based clothing animation method and system for highly efficient virtual try-on simulations is provided. Given a garment, the system preprocess a rich database of physically-based dressed character simulations, for multiple body shapes and animations. Then, using a database, the system trains a learning-based model of cloth drape and wrinkles, as a function of body shape and dynamics. A model according to embodiments separates global garment fit, due to body shape, from local garment wrinkles, due to both pose dynamics and body shape. A recurrent neural network is provided to regress garment wrinkles, and the system achieves highly plausible nonlinear effects, in contrast to the blending artifacts suffered by previous methods.

29 Claims, 7 Drawing Sheets

(51) Int. Cl.
*G06N 3/04* (2006.01)
*G06N 3/08* (2006.01)
*G06Q 30/06* (2012.01)
*G06T 13/20* (2011.01)

(52) U.S. Cl.
CPC .......... *G06T 13/20* (2013.01); *G06T 2210/16* (2013.01); *G06T 2219/2021* (2013.01)

(58) Field of Classification Search
USPC ........................................................ 345/418
See application file for complete search history.

(56) References Cited

U.S. PATENT DOCUMENTS 10,922,898 B2 * 2/2021 Aluru ................. G06K 9/00281
2014/0313192 A1 10/2014 Corazza et al.
2017/0161948 A1 6/2017 Hua et al.

OTHER PUBLICATIONS

Pons-Moll G, Pujades S, Hu S, Black MJ. ClothCap: Seamless 4D clothing capture and retargeting. ACM Transactions on Graphics (TOG). Jul. 20, 2017;36(4):1-5.*
Santesteban I, Otaduy MA, Casas D. Learning-based animation of clothing for virtual try-on. InComputer Graphics Forum May 2019 (vol. 38, No. 2, pp. 355-366).*
International Application No. PCT/US2019/065690, International Search Report and Written Opinion mailed Apr. 1, 2020, 19 pages.
Zorah et al., "DeepWrinkles: Accurate and Realistic Clothing Modeling," ECCV paper,Sep. 14, 2018, pp. 1-18.
Santesteban et al., "Learning-Based Animation of Clothing for Virtual Try-On," Eurographics, vol. 38, No. 2, Mar. 17, 2019, pp. 1-12.
Gundogdu et al., "GarNet: A Two-stream Network for Fast and Accurate 3D Cloth Draping," arXIV.org, Nov. 27, 2018, pp. 1-8.

* cited by examiner

Prior Art

(a) Before  (b) After

LEARNING-BASED ANIMATION OF CLOTHING FOR VIRTUAL TRY-ON

CROSS-REFERENCE TO RELATED APPLICATIONS

This application claims priority to U.S. Provisional Patent Application No. 62/781,828 entitled "Learning-Based Animation of Clothing for Virtual Try-On," filed Dec. 19, 2018, the contents of which are hereby incorporated by reference in their entirety.

BACKGROUND

This disclosure generally relates to computer modeling systems, and more specifically to a system and method for simulating clothing to provide a data-driven model for animation of clothing for virtual try-on.

Clothing plays a fundamental role in our everyday lives. When we choose clothing to buy or wear, we guide our decisions based on a combination of fit and style. For this reason, the majority of clothing is purchased at brick-and-mortar retail stores, after physical try-on to test the fit and style of several garments on our own bodies. Computer graphics technology promises an opportunity to support online shopping through virtual try-on animation, but to date virtual try-on solutions lack the responsiveness of a physical try-on experience. Beyond online shopping, responsive animation of clothing has an impact on fashion design, video games, and interactive graphics applications as a whole.

One approach to produce animations of clothing is to simulate the physics of garments in contact with the body. While this approach has proven capable of generating highly detailed results [KJM08, SSIF09, NSO12, CLMMO14], it comes at the expense of significant runtime computational cost. On the other hand, it bears no or little preprocessing cost, hence it can be quickly deployed on almost arbitrary combinations of garments and body shapes and motions. To fight the high computational cost, interactive solutions sacrifice accuracy in the form of coarse cloth discretizations, simplified cloth mechanics, or approximate integration methods. Continued progress on the performance of solvers is bringing the approach closer to the performance needs of virtual try-on [TWL*18].

An alternative approach for cloth animation is to train a data-driven model that computes cloth deformation as a function of body motion [WHRO10, dASTH10]. This approach succeeds to produce plausible cloth folds and wrinkles when there is a strong correlation between body pose and cloth deformation. However, it struggles to represent the nonlinear behavior of cloth deformation and contact in general. Most data-driven methods rely to a certain extent on linear techniques, hence the resulting wrinkles deform in a seemingly linear manner (e.g., with blending artifacts) and therefore lack realism.

Most previous data-driven cloth animation methods work for a given garment-avatar pair, and are limited to representing the influence of body pose on cloth deformation. In virtual try-on, however, a garment may be worn by a diverse set of people, with corresponding avatar models covering a range of body shapes. Other methods that account for changes in body shape do not deform the garment in a realistic way, and either resize the garment while preserving its style [GRH*12, BSBC12], or retarget cloth wrinkles to bodies of different shapes [PMPHB17, LCT18].

Related Work These prior techniques rely on some approaches that are the basis upon which the present virtual try-on disclosure improves, including some forms of physics-based simulation, early data-driven models, and related work that is further described below. For example, conventional physics-based simulation of clothing entails three major processes: computation of internal cloth forces, collision detection, and collision response; and the total simulation cost results from the combined influence of the three processes. One attempt to limit the cost of simulation has been to approximate dynamics, such as in the case of position-based dynamics [BMO*14]. While approximate methods produce plausible and expressive results for video game applications, they cannot transmit the realistic cloth behavior needed for virtual try-on.

Another line of work, which tries to retain simulation accuracy, is to handle efficiently both internal forces and collision constraints during time integration. One example is a fast GPU-based Gauss-Seidel solver of constrained dynamics [FTP16]. Another example is the efficient handling of nonlinearities and dynamically changing constraints as a superset of projective dynamics [OBLN17]. More recently, Tang et al. [TWL*18] designed a GPU-based solver of cloth dynamics with impact zones, efficiently integrated with GPU-based continuous collision detection.

A different approach to speed up cloth simulation is to apply adaptive remeshing, focusing simulation complexity where needed [NSO12]. Similar in spirit, Eulerian-on-Lagrangian cloth simulation applies remeshing with Eulerian coordinates to efficiently resolve the geometry of sharp sliding contacts [WPLS18].

LagrangianSimilarly, inspired by early works that model surface deformations as a function of pose [LCF00, SRIC01], some existing data-driven methods for clothing animation also use the underlying kinematic skeletal model to drive the garment deformation [KV08, WHRO10, GRH*12, XUC*14, HTC*14]. Kim and Vendrovsky [KV08] introduced a pose-space deformation approach that uses a skeletal pose as subspace domain. Hahn et al. [HTC*14] went one step further and performed cloth simulation in pose-dependent dynamic low-dimensional subspaces constructed from precomputed data. Wang et al. [WHRO10] used a precomputed database to locally enhance a low-resolution clothing simulation based on joint proximity.

Other methods produce detailed cloth animations by augmenting coarse simulations with example-based wrinkle data. Rohmer et al. [RPC*10] used the stretch tensor of a coarse animation output as a guide for wrinkle placement. Kavan et al. [KGBS11] used example data to learn an upsampling operator that adds fine details to a coarse cloth mesh. Zurdo et al. [ZBO13]proposed a mapping between low and high-resolution simulations, employing tracking constraints [BMWG07] to establish a correspondence between both resolutions. More recently, Oh et al. [OLL18] have shown how to train a deep neural network to upsample low-resolution cloth simulations.

A different approach for cloth animation is to approximate full-space simulation models with coarse data-driven models. James and Fatahalian [JF03] used efficient precomputed low-rank approximations of physically-based simulations to achieve interactive deformable scenes. De Aguiar et al. [dASTH10] learned a low-dimensional linear model to characterize the dynamic behavior of clothing, including an approximation to resolve body-cloth collisions. Kim et al. [KKN*13] performed a near-exhaustive precomputation of a cloth's state throughout the motion of a character. At run-time a secondary motion graph was explored to find the closest cloth state for the current pose. However, this method cannot generalize to new motions. Xu et al. [XUC*14] used a precomputed dataset to mix and match parts of different samples to synthesize a garment mesh that matches the current pose.

However, virtual try-on requires cloth models that respond to changes in body pose and shape in real time, as different users, through corresponding avatars try on the garment, changing pose, turning around, etc. to see the fit of the garment from different perspectives. Current data-driven cloth animation methods do not provide statisfactory results. Guan et al. [GRH*12] dressed a parametric character and in dependently modeled cloth deformations due to shape and pose. However, they relied on a linear model that struggles to generate realistic wrinkles, specially under fast motions. Moreover, they accounted for body shape by resizing the cloth model, which is a major drawback for virtual try-on. Other works also apply a scaling factor to the garment to fit a given shape, without realistic deformation [YFHWW18, PMPHB17, LCT18]. This hinders the ability for a user to try on a given size garment and see its fit on the user's body shape. In essence, the prior methods automatically resize the garment to a different size that fits the model, which defeats the purpose of the virtual try-on for the given garment size.

In another line of work, taking advantage of the recent improvements on performance capture methods [BPS*08, ZPBPM17, PMPHB17], virtual animation of real cloth that has been previously captured (and not simulated) has become an alternative. Initial attempts fit a parametric human model to the captured 3D scan to enable the re-animation of the captured data, without any explicit cloth layer [JTST10, FCS15]. More elaborate methods extract a cloth layer from the captured 3D scan and fit a parametric model to the actor [YFHWW18,NH13,PMPHB17,LCT18]. This allows editing the actor's shape and pose parameters while keeping the same captured garment or even changing it. However, re-animated motions lack realism since they cannot predict the nonrigid behavior of clothing under unseen poses or shapes that could take place when a user trys on a garment, and are usually limited to copying wrinkles across bodies of different shapes [PMPHB17, LCT18], not generating the wrinkles that would be caused by the different shaped bodies. In yet another approach, cloth animation and virtual try-on methods have also been explored from an image-based point of view [SM06, ZSZ*12, HSR13, HFE13, HWW*18]. These methods aim to generate compelling 2D images of dressed characters, without dealing with any 3D model or simulation of any form. Hilsmann et al. [HFE13] proposed a pose-dependent image-based method that interpolates between images of clothes. More recently, Han et al. [HWW*18] have shown photorealistic results using convolutional neural networks. However, image-based methods are limited to 2D static images and fixed camera position, and cannot fully convey the 3D fit and style of a garment.

Thus, what is needed, is a data-driven approach to modeling more realistic garments on different body shapes and different poses in real-time to enable a realistic virtual try-on experience.

BRIEF SUMMARY

According to various embodiments of the present invention, virtual try-on system and method is provided.

According to one embodiment, a learning-based method for cloth animation is provided that meets the needs of virtual try-on, as it models the deformation of a given garment as a function of body motion and shape. In one embodiment, a multi-level strategy is used to learn the complex nonlinear deformations of clothing. According to embodiments, a model of garment fit is learnt as a function of body shape. According to other embodiments, a model of local garment wrinkles is learnt as a function of body shape and motion. According to yet other embodiments, a two-level strategy combines the two learning models and allows to disentangle the different sources of cloth deformation.

According to one embodiment, both the garment fit and the garment wrinkles are computed using nonlinear regression models, i.e., artificial neural networks, and hence the problems of linear data-driven models is avoided. Furthermore, the use of recurrent neural networks provides for the capture of the dynamics of wrinkles. According to one embodiment, using this strategy avoids adding an external feedback loop to the network, which typically requires a dimensionality reduction step for efficiency reasons [CO18].

The learning-based cloth animation method according to embodiments is formulated as a pose-space deformation, which can be easily integrated into skeletal animation pipelines with little computational overhead.

According to embodiments, the learning-based model is trained with physics-based cloth simulation techniques [NSO12], together with a parametric human model [LMR*15] and publicly available motion capture data [CMU, VRM*17].

Specifically, in embodiments, a computer-implemented method for generating a digital representation of clothing on a body is provided. The body may be modeled by a body template mesh having body parameters, including a shape and a pose. In one embodiment, the method obtains a clothing template mesh for the clothing that includes a set of vertices. The clothing template mesh is subjected to a non-linear regressor. The non-linear regressor is trained on a plurality of examples of deformations in training garment models. The deformation in the training garment models are due to a plurality of training body model parameters. In one embodiment, the non-linear regressor is configured to obtain deformations to the vertices of the clothing template mesh based, at least in part, on the shape parameters of the body template mesh. The method also provides an output template mesh of the clothing reflecting the deformations.

In embodiments, the deformations may correspond to a fit of the clothing on the body based on the body shape parameters of the body template mesh. Additionally, the non-linear regressor may be implemented based on a single-hidden-layer multilayer perception (MLP) neural network.

In embodiments, the deformations may also or alternatively correspond to wrinkles in the clothing based on the pose and the shape body parameters of the body template mesh. In these embodiments, the non-linear regressor may be implemented based on a Recurrent Neural Network (RNN).

According to other embodiments, the clothing template mesh may be further subjected to a second non-linear regressor trained on a plurality of examples of wrinkle-based deformations in the training garment models. In these embodiments, the deformations in the training garment models are due to the plurality of training body model parameters. In addition, the second linear regressor may be configured to obtain second deformations to the vertices of the clothing template mesh based on the shape and the pose body parameters of the body template mesh. These second deformations would correspond to wrinkles in the clothing being modeled based on the pose and the shape body parameters of the body template mesh provided.

In some embodiments, the linear regressor may be trained with a plurality of examples of deformations in training garment models due to the plurality of training body model parameters, and be configured to encode a space model of variability in the clothing template mesh due to changes of at least body shape parameters but may also encode variability due to changes in body pose. The variability in the clothing template mesh may represent at least one of fit of the clothing on the body and/or wrinkles in the clothing due to the body.

According to other embodiments, a computer-implemented method for simulating clothing on a skeletal model is also provided. This method includes learning a body-shape based cloth deformation space model for a template clothing mesh from a first three-dimensional example data set of cloth mesh instances. The learnt cloth deformation space model encodes variability in said template cloth mesh based at least on changes in body shape. The method further includes receiving as input a computer-based skeletal model defining a body shape and a pose and a computer model of an item of clothing. The computer model of the item of clothing defines a size of the item of clothing. The method includes computing an unposed cloth mesh representing the item of clothing fitted on the body shape defined by the computer-based skeletal model while preserving the size of the item of clothing. The method also includes generating a three-dimensional surface of the item of clothing fitted on the body based on the unposed cloth mesh.

According to embodiments, computing the unposed cloth mesh may comprise performing a non-linear regression of the computer model of the item of clothing based on learned instances of prior fitted unposed cloth meshes for a plurality of different training body shapes. In one embodiment, this computing may be implemented with a single-hidden-layer multilayer perception (MLP) neural network.

According to embodiments, a computer-implemented method for simulating clothing on a skeletal model is provided. This method includes receiving as input a computer-based skeletal model defining a body shape and a pose and one or more computer models of clothing items. The method also includes computing an unposed cloth mesh based on a linear regression based on learnt samples. The unposed cloth mesh fits the one or more computer models of the clothing items onto the body shape defined by the computer-based skeletal model. The method further includes computing simulated garment wrinkles deformations based on the body shape and the pose defined by the computer-based skeletal model and applying the computed garment wrinkles onto the unposed cloth mesh to generate a posed output cloth mesh.

In embodiments, the computing the simulated garment wrinkles deformations may be based on a non-linear regressor implemented with a a Recurrent Neural Network (RNN). In these embodiments, the deformations may correspond to a fit of the clothing on the body based on the body shape parameters of the body template mesh.

According to embodiments, systems for generating a digital representation of clothing on a body are provided. These system comprise one or more processors and non-transitory computer readable media. The non-transitory computer readable media includes instructions that when executed by the processor configures the processor to perform the claimed method steps of the various methods provided. In embodiments, the processors may distributed, including a plurality of processing units communicatively coupled via a computer network.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION

The above and other needs are met by the disclosed methods, a non-transitory computer-readable storage medium storing executable code, and systems for 3D modeling of clothing and cloth items in computer applications such as virtual try-on but may used in other applications, including, for example, garment design and virtual modeling, motion capture applications, biomechanics and ergonomics design and simulation, education, business, virtual and augmented reality shopping, and entertainment applications, including animation and computer graphics for digital movies, interactive gaming and videos, human, animal, or character simulations, virtual and augmented reality applications, robotics, and the like. The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1A:
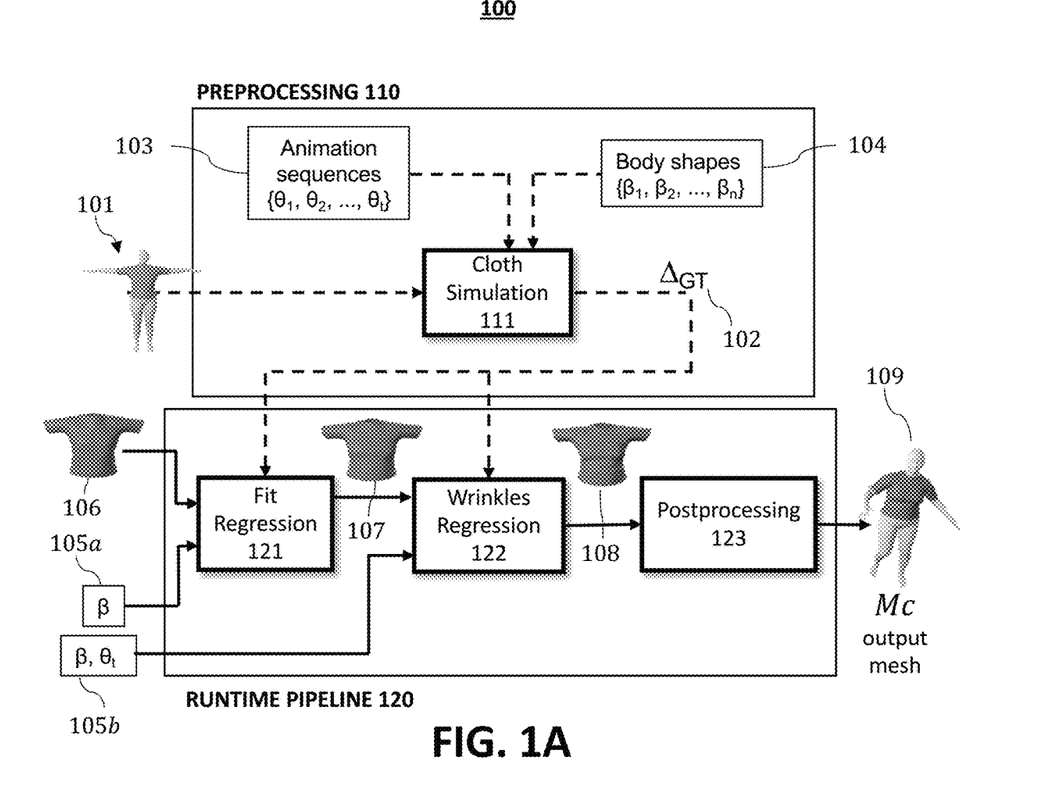
FIG. 1A is a block diagram illustrating a data-driven cloth modeling system according to embodiments of the disclosure.

Referring now to FIG. 1A, a diagram of a learning-based data-driven system to animate the clothing of a virtual character according to embodiments is provided. According to one embodiment, a learning-based system 100 is provided to augment a skinning-based character animation with realistic nonlinear garment deformations. A runtime pipeline 120, takes as input a current body shape β 105a, obtained, for example, using motion capture or by editing a rigged character, avatar, or other representation of a body. The runtime pipeline 120 also takes as input frames of skeletal animation of the body shape β 105a at time-varying pose $\theta_t$ 105b. For each frame of the skeletal animation, the system 100 produces a fitted garment and body mesh $M_t$ 109, including garment wrinkle effects due to body shape and pose in the given frame. The runtime pipeline 120 includes three main blocks: a garment fit regression module 121, a garment wrinkle regression module 122, and a post-processing module 123. According to embodiments, the garment fit regression module 121 applies global body-shape-dependent deformations to the input garment 106. In embodiments, the garment wrinkle regression module 122 predicts dynamic wrinkle deformations as a function of body shape β 105a and time-varying pose $\theta_t$ 105b. Similarly, in embodiments, the post-processing module 123 includes a skinning module that combines the unposed fitted garment model with corresponding wrinkle deformations with a body pose $\theta_t$ 105b for the current frame t to produce the deformed surface mesh (i.e., a fitted garment and body mesh) $M_t$ 109.

Further, according to embodiments, a preprocessing stage 110 generates physics-based simulations of multiple animated bodies wearing the same garment that is used in the runtime regression modules. The preprocessing stage 110 includes a cloth simulation module 111. In one embodiment, cloth simulation module 111 is a physics-based cloth simulation engine, for example implemented using ARCSim [NSO12, NPO13]. The cloth simulation module 111 takes as input garment mesh template 101 and shape parameters 104 and pose parameters 103 from a template body mesh $T_b$. The cloth simulation module 111 provides ground-truth garment fit and garment wrinkle data $\Delta_{GT}$ 102 as output. The cloth simulation module 111 allows for user-defined parameters to provide a simulated clothing item. For example, different knit types, different fabric compositions (e.g., cotton, polyester, wool, linen, silk, etc.) with single fabrics or mixes of fabrics in different ratios, and the like. In one embodiment, a T-shirt was simulated using an interlock knit with 60% cotton and 40% polyester.

Figure 1B:
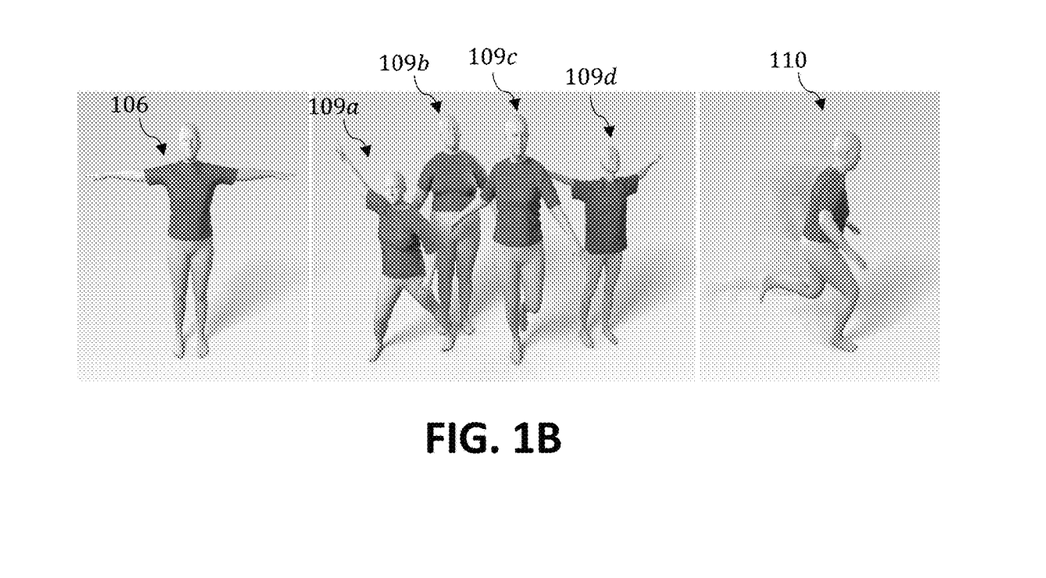
FIG. 1B provides illustrations of body shapes and poses with a garment simulated according to embodiments of the disclosure.

Referring now to FIG. 1B, an illustration of the input and outputs of a learning-based data-driven system to animate the clothing of a virtual character according to embodiments is provided. Given a garment (e.g., garment 101 in FIG. 1A or a template cloth mesh 106, which may be a low-pass filtered version of the garment), a learnt deformation model enables virtual try-on by bodies 109a-109d with different shapes and poses. The models according to embodiments of the dislcosure produce cloth animations 110 with realistic dynamic drape and wrinkles.

According to embodiments, a deformed human body mesh $M_b$ may be determined by shape parameters β (e.g., the principal components of a database of body scans) and pose parameters θ (e.g., joint angles). Further, according to embodiments, a deformed garment mesh worn by the human body mesh $M_c$ 109 is provided. In these embodiments, a cloth mesh Sc(β, θ) 108 (in FIG. 1A) simulating the deformation and contact mechanics of the garment on a body mesh with shape β and pose θ is approximated using a data-driven model instead of a physics-based simulation.

Based on the observation that most garments closely follow the deformations of the body, a clothing model according to embodiments is provided based in part on the Pose Space Deformation (PSD) literature [LCF00] and subsequent human body models [ASK*05, FCS15, LMR*15]. The body mesh is assumed to be deformed according to a rigged parametric human body model:

$$M_b(\beta,\theta)=W(T_b(\beta,\theta),\beta,\theta,\mathcal{W}_b), \qquad (1)$$

where W (·) is a skinning function, which deforms an unposed body mesh $T_b(\beta, \theta) \in \mathbb{R}^{3 \times V_b}$ with $V_b$ vertices based on: first, the shape parameters $\beta \in \mathbb{R}^{|\beta|}$, which define joint locations of an underlying skeleton; and second, the pose parameters $\theta \in \mathbb{R}^{|\theta|}$, which are the joint angles to articulate the mesh according to a skinning weight matrix $\mathcal{W}_b$. The unposed body mesh may be obtained additionally by deforming a template body mesh $T_b$ to account for body shape and pose-based surface corrections (See, e.g., [LMR*15]).

Figure 2:
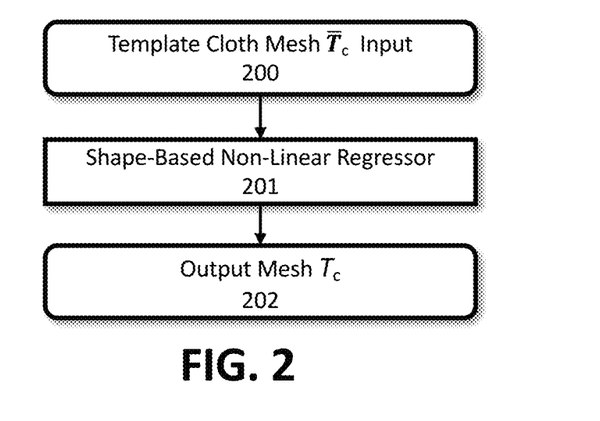
FIG. 2 is flow chart of a method for modeling clothing according to embodiments of the disclosure.
Figure 3:
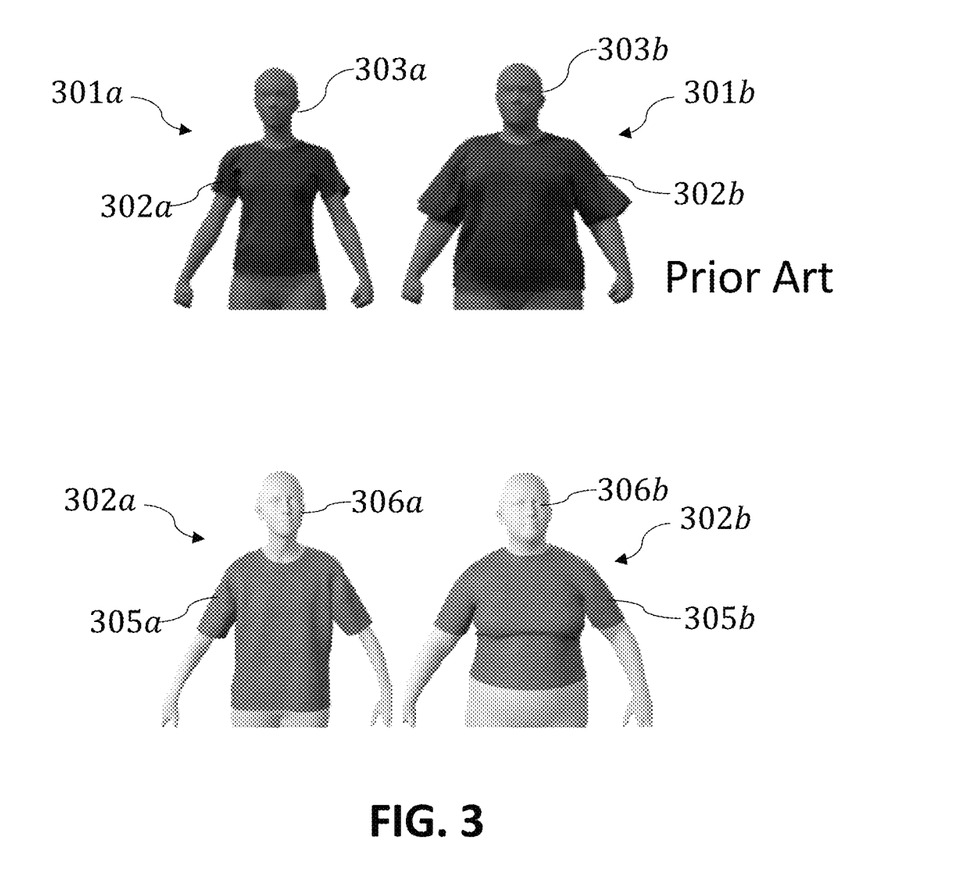
FIG. 3 provides illustrations of results simulations for comparison according to aspects of embodiments of the disclosure.

Referring now to FIG. 2, according to embodiments, cloth deformations may be modeled following a similar overall process. For a given garment, a template cloth mesh 106 $T_c \in \mathbb{R}^{3 \times V_c}$ with $V_c$ vertices is provided 200 as input. The template cloth mesh 106 includes garment parameters for a given garment of a given size and design. The template cloth mesh 106 is subjected 201 to a non-linear garment fit regressor $R_G$( ) that takes as input body shape parameters β 105a that are applied to the input cloth mesh 106. According to this embodiment, an unposed cloth mesh $T_c(\beta, \theta)$ is output 202. Thus, a fitted garment model, deformed to match the shape parameters of a given body shape is thereby provided. Using this approach, overcomes the prior garment modeling methods that automatically resize the modeled garment to fit the different body shapes. For example, FIG. 3 illustrates the results of this approach. Referring to FIG. 3, illustrations 301a and 301b show the result of prior art method DRAPE [GRH*12] when the same garment 302 is worn by two avatars 303a and 303b with significantly different body shapes. DRAPE approximates the deformation of the garment by scaling it such that garment 302a is smaller in size than garment 302b adjusted in size to fit the target shape. This produces plausible but unrealistic results. In contrast, as illustrated by illustrations 302a and 302b, applying a method according to embodiments of this disclosure deforms the garment 305 in a realistic manner When the garment 305a is modeled on a smaller avatar body shape 306a, it provides a loose fit. While when the same garment model 305b is modeled over the larger avatar body shape 306b, the garment is stretched and wrinkled while maintaining the same size, showing a more realistic virtual try-on result.

Figure 4:
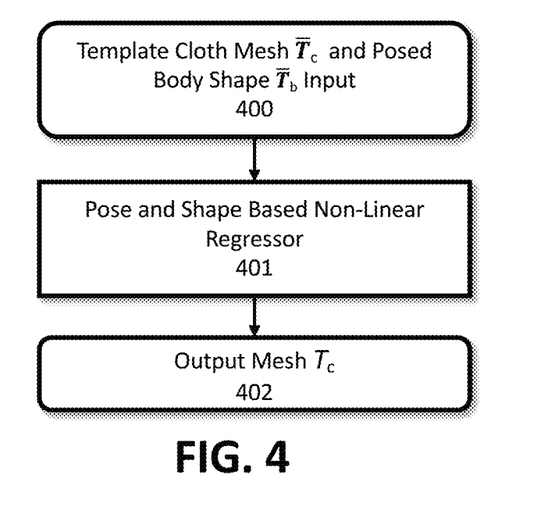
FIG. 4 is flow chart of a method for modeling clothing according to embodiments of the disclosure.

According to these embodiments, the fitted garment mesh $T_c(\beta, \theta)$ may be used in post-processing to provide an un-posed (or default posed) skinned avatar result. Now referring to FIG. 4, according to other embodiments, a method for simulating full cloth deformation, for example for a virtual try-on application, is described. For a given garment, a template cloth mesh 106 $T_c \in \mathbb{R}^{3 \times V_c}$ with $V_c$ vertices is provided 400 as input. In addition, a template body mesh $T_b$ to account for body shape and pose-based surface corrections. The template cloth mesh 106 includes garment parameters for a given garment of a given size and design and the template body mesh also includes body shape 105a and pose 105b parameters as described above. The template cloth mesh 106 and body mesh are subjected 401 to a non-linear garment wrinkle regressor $R_L(\ )$ that takes as input body shape β 105a and pose $θ_t$ 105b parameters that are applied to the input cloth mesh 106. According to this embodiment, a cloth mesh Sc(β, θ) 108 simulating the deformation and contact mechanics of the garment on a body mesh with shape β and pose θ is output. According to these embodiments, the deformed cloth mesh Sc(β, θ) 108 may be used in post-processing to provide a posed skinned avatar for each frame of a series of frames, for example in a virtual try-on application.

Figure 5:
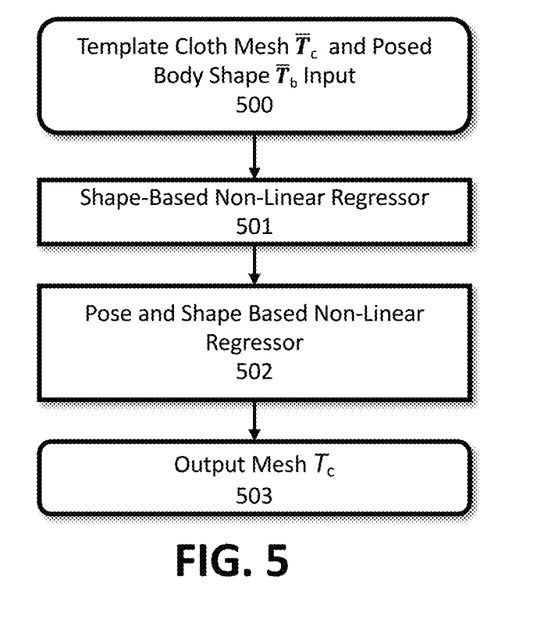
FIG. 5 is flow chart of a method for modeling clothing according to embodiments of the disclosure.

Now referring to FIG. 5, according to embodiments, a method for modeling cloth deformations, for example for virtual try-on applications, is provided. According to these embodiments, a two-level strategy is used to learn the complex nonlinear deformations of clothing. A template cloth mesh 106 $T_c \in \mathbb{R}^{3 \times V_c}$ and a template body mesh $\overline{T}_b$ are provided as input at 500. According to these embodiments, for a given garment, the template cloth mesh 106 $T_c \in \mathbb{R}^{3 \times V_c}$ with $V_c$ vertices is subjected at 501 to a non-linear garment fit regressor $R_G(\ )$ that takes as input body shape parameters β 105a that are applied to the input cloth mesh 106. The resulting unposed cloth mesh $T_c(β, θ)$ is then deformed at 502 using the skinning function W (·) to produce the full cloth deformation. To compute body shape-dependent garment fit and shape-and-pose-dependent garment wrinkles as corrective displacements to the template cloth mesh, to produce the unposed cloth mesh:

$$T_c(β,θ) = \overline{T}_c + R_G(β) + R_L(β,θ), \quad (2)$$

where garment fit regressor $R_G(\ )$ 501 and garment wrinkle regressor $R_L(\ )$ 502 represent two nonlinear regressors, which take as input body shape parameters and shape and pose parameters, respectively.

According to these embodiments, the final cloth skinning step 503 can be formally expressed as:

$$M_c(β,θ) = W(T_c(β,θ),β,θ,\mathcal{W}_c) \quad (3)$$

According to embodiments, a skinning weight matrix $\mathcal{W}_c$ is defined by projecting each vertex of the template cloth mesh onto the closest triangle of the template body mesh, and interpolating the body skinning weights $\mathcal{W}_b$.

Figure 6:
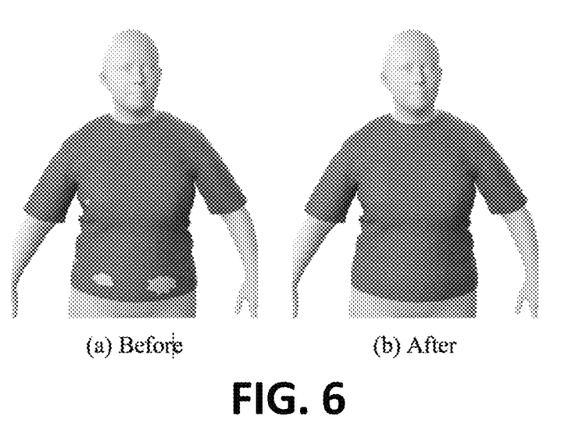
FIG. 6 provides illustrations of results of postprocessing functions according to aspects of embodiments of the disclosure.

Referring back to FIG. 1, for illustration, a pipeline according to these embodiments shows avatar 101 with the template body mesh $\overline{T}_b$ wearing the template cloth mesh $\overline{T}_c$, and then the template cloth mesh 106 in isolation, with the addition of garment fit 107, with the addition of garment wrinkles 108, and the final deformation after the skinning step 109. According to another aspect of embodiments, one or more of the regressors, $R_G(\ )$ and $R_L(\ )$ as used in different embodiments, are trained with collision-free data. According to these embodiments, the data-driven model learns naturally to approximate contact interactions, but it does not guarantee collision-free cloth outputs. In particular, when the garments are tight, interpenetrations with the body can become apparent. Accordingly, in embodiments, the output step 202, 402, or 503, after the skinning process may also include additional postprocessing functions, including a step to correct cloth vertices that collide with the body, by pushing them outside their closest body primitive. An example of collision postprocessing is shown in FIG. 6.

Garment Fit Regressor

The learning-based cloth deformation models according to embodiments can represent corrective displacements on the unposed cloth state, as discussed above. Such displacements are produced by two distinct sources. On one hand, the shape of the body produces an overall deformation in the form of stretch or relaxation, caused by tight or oversized garments, respectively. According to embodiemnts, this deformation source is captured as a static global fit, determined by body shape alone. On the other hand, body dynamics produce additional global deformation and small-scale wrinkles. According to embodiments, this deformation source is captured as time-dependent displacements, determined by both body shape and motion. Different embodiments may provide for modeling that capture one or both sources of deformation depending on the intended application. In some embodiments, a higher accuracy is provided by training garment fit and garment wrinkles separately due to their static vs. dynamic nature.

According to embodiments, static garment fit is defined as a vector of per-vertex displacements $\Delta_G \in \mathbb{R}^{3 \times V_c}$. These displacements represent the deviation between the cloth template mesh $\overline{T}_c$ and a smoothed version of the simulated cloth worn by the unposed body. The ground-truth garment fit displacements can be formally defined as $$\Delta_G^{GT} = \rho(S_c(β,θ)) - \overline{T}_c, \quad (4)$$

where $S_c(β, θ))$ represents a simulation of the garment on a body with shape β and pose θ=0, and ρ represents a smoothing operator.

Figure 7:
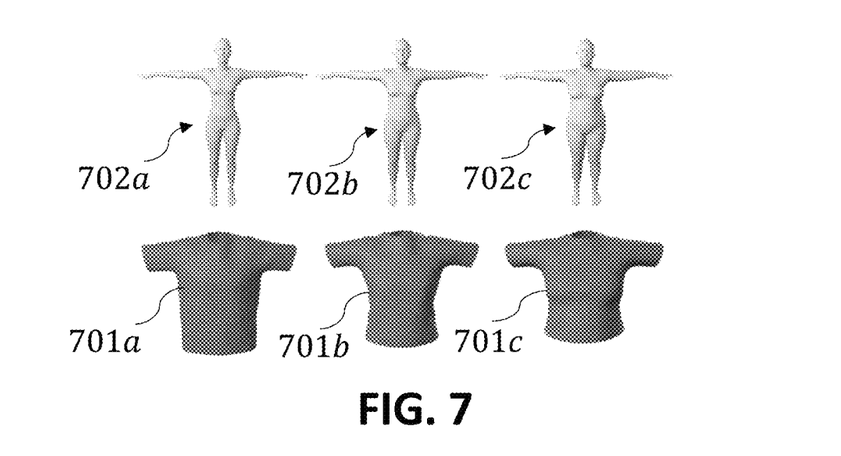
FIG. 7 provides illustrations of simulated garment fit deformations and corresponding body shapes according to embodiments of the disclosure.

In these embodiments, to compute garment fit displacements 201/501 in the data-driven models, a nonlinear garment fit regressor $R_G: \mathbb{R}^{|β|} \to \mathbb{R}^{3 \times V_c}$ may be used, which takes as input the shape of the body β. In embodiments, the regressor $\Delta_G = R_G(β)$ is implemented using a single-hidden-layer multilayer perception (MLP) neural network. However, other non-linear regressors may be used in different embodiments. In these embodiments, the MLP network may be trained by minimizing the mean squared error between predicted displacements $\Delta_G$ and ground-truth displacements $\Delta_G^{GT}$. FIG. 7 illustrates this process with a visualization of garment fit regression. The original template mesh 701a has is globally deformed 701b and 702c to match the corresponding body shape 702b and 702c but lacks pose-dependent wrinkles.

Garment Wrinkle Regressor

According to embodiments, dynamic cloth deformations (e.g., wrinkles) are characterized as a vector of per-vertex displacements $\Delta_L \in \mathbb{R}^{3 \times V_c}$. These displacements represent the deviation between the simulated cloth worn by the moving body, $S_c(β, θ)$, and the template cloth mesh $\overline{T}_c$ corrected with the global garment fit $\Delta_G$. In embodiments, this deviation in the body's rest pose, may be expressed by applying the inverse skinning transformation $W^{-1}(\cdot)$ to the simulated cloth. The ground-truth garment wrinkle displacements can be formally defined as $$\Delta_L^{GT} = W^{-1}(S_c(β,θ),(β,θ,\mathcal{W}_c) - \overline{T}_c - \Delta_G. \quad (5)$$

Figure 8:
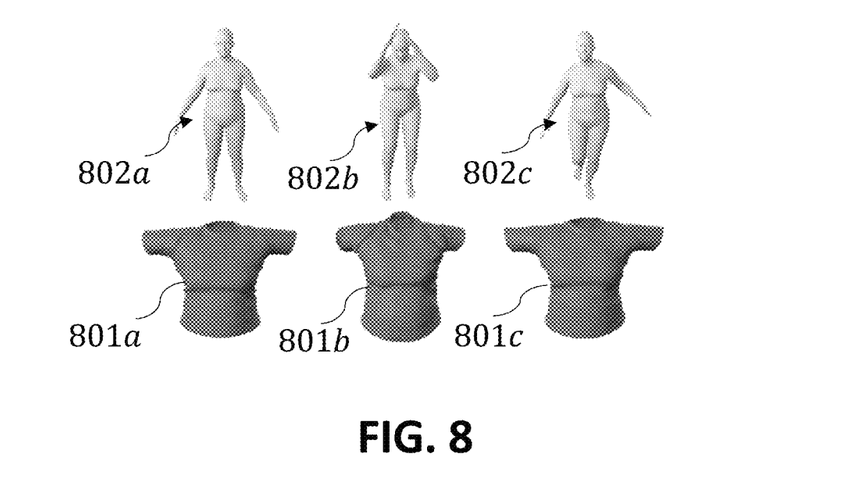
FIG. 8 provides illustrations of simulated garment wrinkle deformations and corresponding body poses according to embodiments of the disclosure.

In these embodiments, to compute garment wrinkle displacements 401/502 in the data-driven models, a nonlinear garment wrinkle regressor $R_L: \mathbb{R}^{|β|+|θ|} \to \mathbb{R}^{3 \times V_c}$ may be used, which takes as input the shape β and pose θ of the body. In contrast to the static garment fit, garment wrinkles exhibit dynamic, history-dependent deformations. In embodiments, these dynamic effects are accounted for by introducing recursion within the regressor. In some embodiments, the regressor $θ_L = R_L(β, θ)$ may be implemented using a Recurrent Neural Network (RNN) based on Gated Recurrent Units (GRU) [CVMG*14], which has proven successful in modeling dynamic systems such as human pose prediction [MBR17]. GRU networks do not suffer from the well-known vanishing and exploding gradients common in vanilla RNNs [PMB13]. However, different recursive non-linear regressors may be used in different embodiments. According to embodiments, the GRU network may be trained by minimizing the mean squared error between predicted displacements ΔL and ground-truth displacements $\Delta_L^{GT}$. FIG. 8 illustrates this process with a a visualization of garment wrinkle regression. In FIG. 8, a template garment 801a fit to the body shape 802a, as for example may be obtained with a garment fit regressor according to embodiments, is further deformed and enriched with pose-dependent dynamic wrinkles, 801b and 801c corresponding to the changes in pose of the avatar model 802b and 802c respectively.

Training Data and Regressor Settings

According to another aspect of embodiemnts of the disclosure, the generation of synthetic training sequences and the extraction of ground-truth data to train the regressor networks is described. In addition, network settings and hyperparameters that may be used in different embodiments are also provided for illustrative purposes.

Dressed Character Animation Dataset

To produce ground-truth data for the training of Garment Fit and Garment Wrinkle Regressors according to various embodiments, a novel dataset of dressed character animations with diverse motions and body shapes may be provided. According to one embodiment, a dataset was created using only one garment, but the same techniques can be applied to other garments or their combinations in other embodiments encompassed within the scope of this disclosure.

According to various embodiments described herein, the use of a parametric human model is relied upon for the modeling of garments, for example in virtual try-on applications. In an exemplary embodiment, the SMPL [LMR*15] paramtric human model is used. In this embodiment, 17 training body shapes were selected as follows. For each of the 4 principal components of the shape parameters β, 4 samples were generated, leaving the rest of the parameters in β as 0. To these 16 body shapes, the nominal shape with β=0 is added.

According to an exemplary embodiment, as animations, character motions from the CMU dataset [CMU], applied to the SMPL body model [VRM*17] were used. Specifically, 56 sequences containing 7 character motions were used, with 117 frames in total (at 30 fps, downsampled from the original CMU dataset of 120 fps). Each of the 56 sequences for each of the 17 body shapes were simulated wearing the same garment mesh (i.e., the exemplary T-shirt shown throughout the figures in this disclosure, which consists of 8, 710 triangles). It should be noted that any garment mesh may be used in different embodiments and even combinations of garments may be used within the scope of the methods and systems of this disclosure. The combination of garments may be modeled as a single mesh or each garment mesh may be processed separately and adjusted during post-processing as for example described with reference to FIG. 6.

All simulations according to an exemplary embodiment were produced using the ARCSim physics-based cloth simulation engine [NSO12, NPO13], with remeshing turned off to preserve the topology of the garment mesh. Note however, that any other sutiable physics-based cloth simulation engine may used in different embodiemnts. According to this exemplary embodiment, ARCSim required setting several material parameters. In this example, since a T-shirt was simulated, an interlock knit with 60% cotton and 40% polyester was selected from a set of measured materials [WRO11]. In this exemplary embodiment, simulations were executed using a fixed time step of 3.33 ms, with the character animations running at 30 fps and interpolated to each time step. The output database with the simulation results from 1 out of every 10 time steps was stored to match the frame rate of the character animations. This produced a total of 120, 989 output frames of cloth deformation.

In this exemplary embodiment, ARCSim required a valid collision-free initial state. To this end, the garment mesh was manually pre-position once on the template body mesh $T_b$. However, in other embodiments, for example if collision-free is not a requirement, this step may be omitted. The simulation according to this embodiment was run to let the cloth relax first, and thus define the initial state for all subsequent simulations. In addition, a smoothing operator ρ(·) may be applied to this initial state to obtain the template cloth mesh $T_c$. Any other suitable approaches to obtain the template cloth mesh may be used in different embodiments.

In embodiemnts, the generation of ground-truth garment fit data may require the simulation of the garment worn by unposed bodies of various shapes. In one exemplary embodiment, the shape parameters were incrementally interpolated from the template body mesh to the target shape, while simulating the garment from its collision-free initial state. Once the body reaches its target shape, the cloth is allowed to rest, and the ground-truth garment fit displacements $\Delta_G^{GT}$ may be computed according to Equation 4.

Similarly, in one exemplary embodiment, to simulate a garment on animations with arbitrary pose and shape, both shape and pose parameters are incrementally interpolated from the template body mesh to the shape and initial pose of the animation. Then, the cloth is allowed to rest before starting the actual animation. In this embodiment, the simulations produce cloth meshes $S_c(\beta, \theta)$, and from these the ground-truth garment wrinkle displacements $\Delta_L^{GT}$ may be computed according to Equation 5.

Network Implementation and Training

According to embodiments, neural networks for garment fit and garment wrinkle regressors may be implemented using Tensorflow [AAB*15]. In other embodiments, other suitable neural network implementations may be used. In one embodiment, an MLP network for garment fit regression contains a single hidden layer with 20 hidden neurons. In this embodiment, this configuration was sufficient to predict the global fit of the garment however multiple layers with a different number of neurons may be used in different embodiments. Similarly, in this exemplary embodiment, a GRU network for garment wrinkle regression was used with a single hidden layer but used instead 1500 hidden neurons. In this embodiment, this configuration was found to provide a good fit of the test data but, as one of skill in the art will recognize, other neural network configurations, with more layers or different numbers of neurons may be used. According to one exemplary embodiment, in both networks, dropout regularization was optionally applied to avoid overfitting the training data, which may not be implemented in different embodiments. In this exemplary embodiment, 20% of the hidden neurons were randomly disabled on each optimization step and the training data was shuffled at the beginning of each training epoch. Different techniques may be implemented in other embodiments within the scope of this disclosure as those of skill in the art will recognize.

In this exemplary embodiment, the training process was implemented with a learning rate of 0.001, using the Adam optimizer, with 2000 epochs. For the garment fit MLP network, the ground-truth data from all 17 body shapes was used for training. For the garment wrinkle GRU network, the ground-truth data from 52 animation sequences was used for training, leaving 4 sequences for testing purposes. When training the GRU network, a batch size of 128 was used in this embodiment. Furthermore, to speed-up the training process of the GRU network in this embodiment, the training error was computed using Truncated Backpropagation Through Time (TBPTT), with a limit of 90 time steps.

Runtime Performance

According to one exemplary embodiment, a modeling system was implemented using an Intel Core i7-6700 CPU, with an Nvidia Titan X GPU with 32 GB of RAM. Table 1 shows average per-frame execution times of this exemplary embodiment including garment fit regression, garment wrinkle regression, and skinning, with and without collision postprocessing. For reference, simulation timings of a CPU-based implementation of full physics-based simulation using ARCSim is provided.

TABLE 1

Per-frame execution times in milliseconds of exemplary embodiments, with and without collision postprocessing. Full physics-based simulation times are also provided for reference.

| | ARCSim [NSO12] | Exemplary Embodiment (w/o post-process) | Exemplary Embodiment (w/ post-process) |
|---|---|---|---|
| Mean | 5635.4 ms | 1.51 ms | 4.01 ms |
| Standard Deviation | 2488.5 ms | 0.28 ms | 0.27 ms |

The low computational cost of the exemplary embodiment shows that the approach disclosed herein is suitable for interactive applications, such as virtual try-on applications. The memory footprint for the exemplary embodiment is as follows: 1.1 MB for the Garment Fit Regressor MLP, and 108.1 MB for the Garment Wrinkle Regressor GRU, both without any compression.

Quantitative Evaluation

Figure 9:
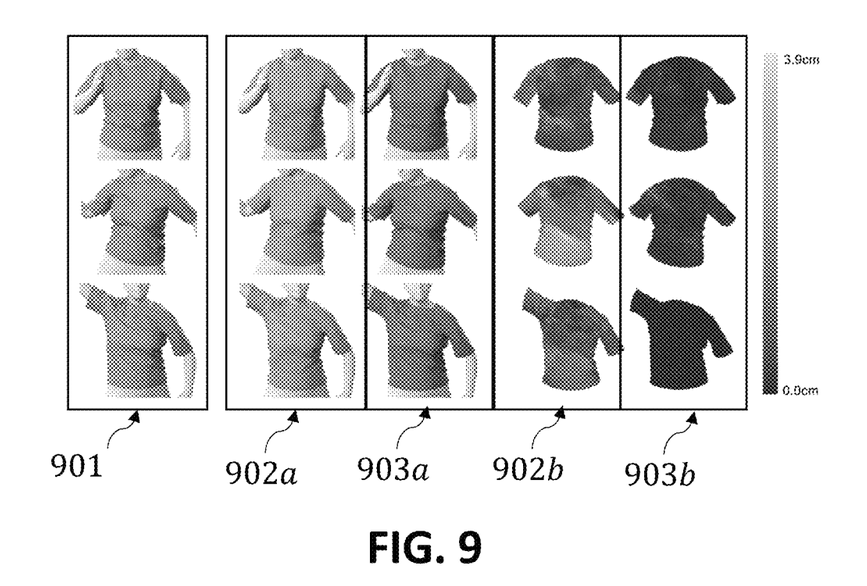
FIG. 9 provides illustrations of simulations of garment deformations for comparison according to embodiments of the disclosure.

Linear vs. nonlinear regression. FIG. 9 provides an illustrative comparison of the fitting quality of the nonlinear regression method according to the exemplary embodiment described above 903 vs. linear regression (implemented using a single-layer MLP neural network), on a training sequence. While our method retains the rich and history-dependent wrinkles, linear regression suffers smoothing and blending artifacts.

Generalization to new body shapes and poses.

The inventors have we quantitatively evaluated the generalization of the proposed approach to new shapes (i.e., not in the training set) and motion sequences with constant body shape but varying pose. The per-vertex mean error achieved on a static pose and a dynamic sequence were examined, as the body shape was changed over time. To provide a quantitative comparison to existing methods, the error suffered by cloth retargeting [LCT18, PMPHB17] was also examined. As discussed above, such retargeting methods scale the garment in a way analogous to the body to retain the garment's style. However, even if retargeting produces appealing results, it does not suit the purpose of virtual try-on, and produces larger error with respect to a physics-based simulation of the garment. The inventors observed that the error with retargeting increases as the shape deviates from the nominal shape, while it remains stable in the results obtained with an exemplary embodiment of the disclosed system.

Similarly, the inventors analyzed the per-vertex mean error in the results achieved with an exemplary embodiment with 2 test motion sequences with constant body shape but varying pose. Cloth animation results according to this exemplary embodiment were obtained using the CMU sequences 01_01 and 55_27 [CMU], which were excluded from the training set, and exhibit complex motions including jumping, dancing and highly dynamic arm motions. The error suffered based on two baseline methods for cloth animation were also examined for comparison: (1) Linear Blend Skinning (LBS), which consists of applying the kinematic transformations of the underlying skeleton directly to the garment template mesh; and (2) a Linear Regressor (LR) that predicts cloth deformation directly as a function of pose, implemented using a single-layer MLP neural network. The results demonstrate that a two step approach according to one embodiment of the disclosure, with separate nonlinear regression of garment fit and garment wrinkles, outperforms the linear approach.

Qualitative Evaluation: Generalization to new shapes and poses.

Figure 10:
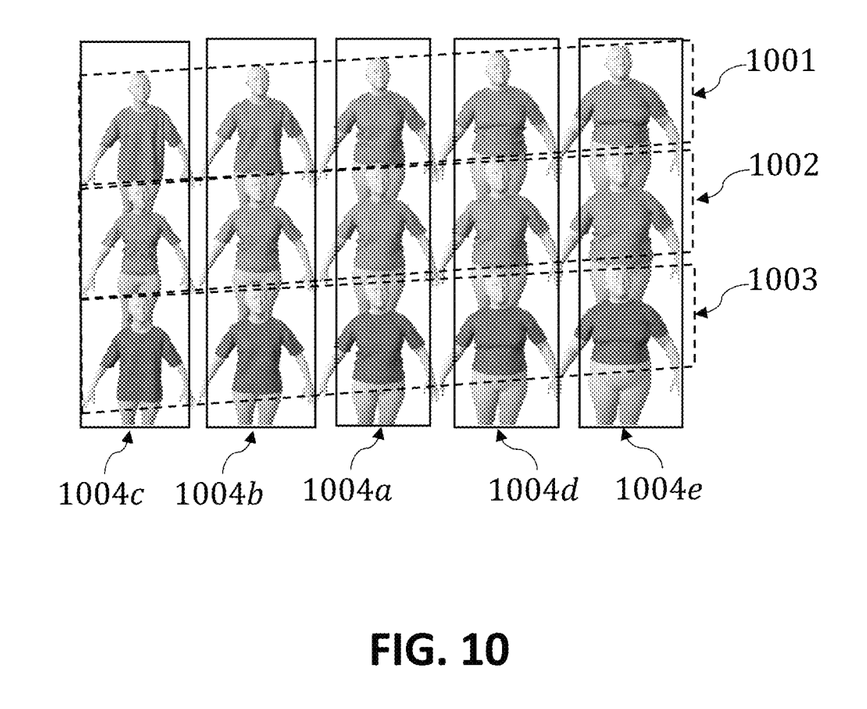
FIG. 10 provides illustrations of simulations of garment fit deformations for comparison according to embodiments of the disclosure.

FIG. 10 provides an illustration of the clothing deformations produced by the exemplary embodiment on a static pose while changing the body shape 1004, the mean body shape 1004a wearing an appropriately sized garment. As the ground-truth physics-based simulation row 1001 shows, as the body shape decreases towards 1004c, the garment becomes oversized for the decreasing body shape. As the body shape increases towards 1004e, the garment becomes undersized for the increasing body shape. The simulation results with retargeting techniques [LCT18, PMPHB17] shown in row 1002, scale the garment, and suffer noticeable artifacts away from the base shape. The results achieved with an exemplary embodiment according to this disclosure (shown in row 1003) successfully reproduces ground-truth deformations, including the overall drape (i.e., how the T-shirt slides up the belly due to the stretch caused by the increasingly fat character) and mid-scale wrinkles, even when changing the body shape beyond training values.

Figure 11:
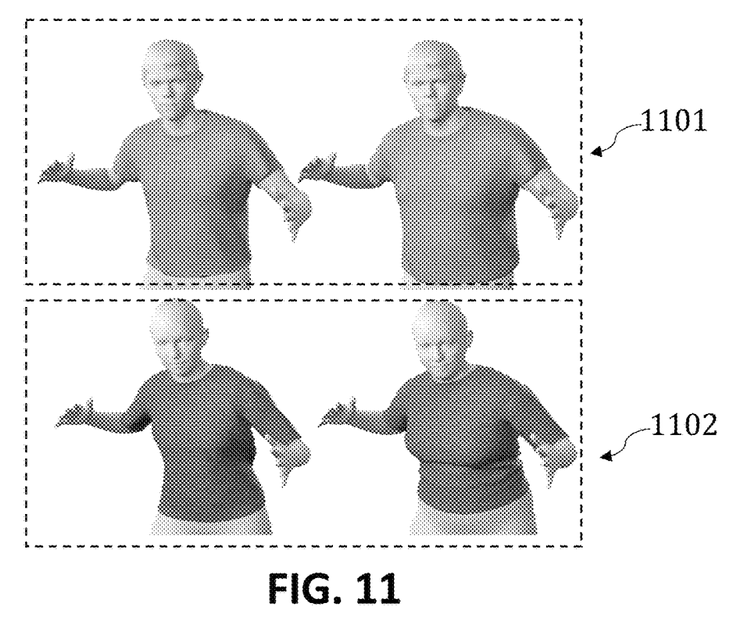
FIG. 11 provides illustrations of simulations of garment wrinkle deformations for comparison according to embodiments of the disclosure.

Similarly, FIG. 11 illustrates the performance of one exemplary embodiment (row 1102) with a comparison to ClothCap [PMPHB17] (row 1101), a performance capture method that reconstructs clothing and shape independently, from 4D scans. A potential application of ClothCap is to retarget or transfer a captured garment to different shapes. However, as the illustrations in row 1101 show, retargeting lacks realism because cloth deformations are simply copied across different shapes. In contrast, the results from an exemplary embodiment in row 1102 show a realistic pose- and shape-dependent deformations.

Figure 12:
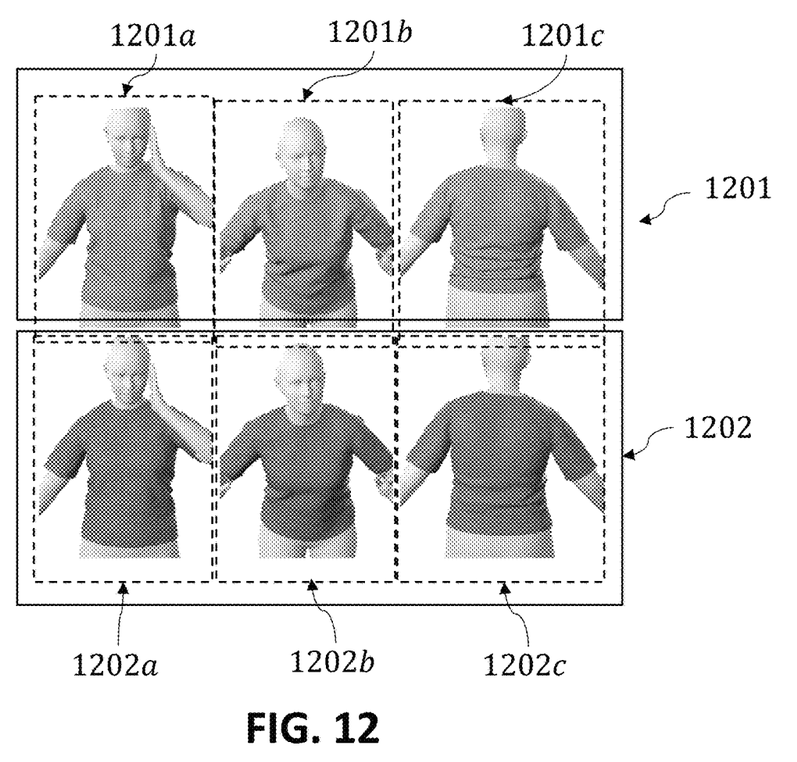
FIG. 12 provides illustrations of frames of simulations of garment wrinkle deformations for comparison according to embodiments of the disclosure.
Figure 13:
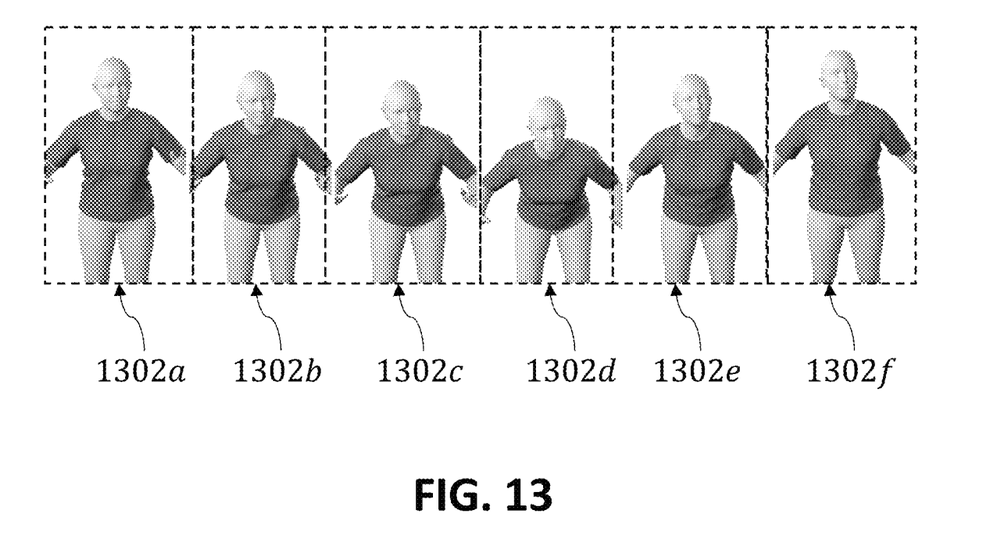
FIG. 13 provides illustrations of frames of simulations of garment wrinkle deformations according to embodiments of the disclosure.

Similarly, FIG. 12 illustrates the performance of a system according to an exemplary embodiment showing results comparing ground-truth physics-based simulations (row 1201) with data-driven cloth deformations results on a test sequence based on the exemplary embodiment (row 1202). The overall fit and mid-scale wrinkles are successfully predicted using the data-driven model according to this exemplary embodiment, with a performance gain of three orders of magnitude. Similarly, in FIG. 13, more frames 1302a-f of a test sequence produced with the data-driven model according to this exemplary embodiment show realistic wrinkles in the belly area that appear when the avatar crouches.

Conclusions

We have presented a novel data-driven method for animation of clothing that enables efficient virtual try-on applications at over 250 fps. Given a garment template worn by a human model, our two-level regression scheme independently models two distinct sources of deformation: garment fit, due to body shape; and garment wrinkles, due to shape and pose. We have shown that this strategy, in combination with the ability of the regressors to represent nonlinearities and dynamics, allows our method to overcome the limitations of previous data-driven approaches.

We believe our approach makes an important step towards bridging the gap between the accuracy and flexibility of physics-based simulation methods and the computational efficiency of data-driven methods. Nevertheless, there are a number of limitations that remain open for future work.

Our method involves independent training per garment. Given the low computational cost of the regressor, it would be possible to animate multiple garments at the same time, for example with a dataset for each garment. Mix-and-match virtual try-on may be performed by training each possible combination of test garments.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the computer modeling arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability. Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

REFERENCES

[AAB*15] ABADI M., AGARWAL A., BARHAM P., BREVDO E., CHEN Z., CITRO C., CORRADO G. S., DAVIS A., DEAN J., DEVIN M., GHE-MAWAT S., GOODFELLOW I., HARP A., IRVING G., ISARD M., JIA Y., JOZEFOWICZ R., KAISER L., KUDLUR M., LEVENBERG J., MANE D., MONGA R., MOORE S., MURRAY D., OLAH C., SCHUSTER M., SHLENS J., STEINER B., SUTSKEVER I., TALWAR K., TUCKER P., VANHOUCKE V., VASUDEVAN V., VIEGAS F., VINYALS O., WARDEN P., WATTENBERG M., WICKE M., YU Y., ZHENG X.: TensorFlow: Large-scale machine learning on heterogeneous systems, 2015. Software available from tensorflow.org.

[ASK*05] ANGUELOV D., SRINIVASAN P., KOLLER D., THRUN S., RODGERS J., DAVIS J.: SCAPE: Shape Completion and Animation of People. ACM Transactions on Graphics (TOG) 24, 3 (2005), 408-416.

[BMO*14] BENDER J., MULLER M., OTADUY M. A., TESCHNER M., MACKLIN M.: A Survey on Position-Based Simulation Methods in Computer Graphics. Computer Graphics Forum 33, 6 (2014).

[BMWG07] BERGOU M., MATHUR S., WARDETZKY M., GRINSPUN E.: TRACKS: Toward Directable Thin Shells. ACM Transactions on Graphics (SIGGRAPH) 26, 3 (July 2007), 50:1-50:10.

[BPS*08] BRADLEY D., POPA T., SHEFFER A., HEIDRICH W., BOUBEKEUR T.: Markerless garment capture. ACM Trans. Graphics (Proc. SIGGRAPH) 27,3 (2008), 99.

[BSBC12] BROUET R., SHEFFER A., BOISSIEUX L., CANI M.-P.: De sign preserving garment transfer. ACM Trans. Graph. 31,4 (2012), 36:1-36:11.

[CLMMO14] CIRIO G., LOPEZ-MORENO J., MIRAUT D., OTADUY M. A.: Yarn-level simulation of woven cloth. ACM Transactions on Graphics (Proc. of ACM SIGGRAPH Asia) 33,6 (2014).

[CMU] CMU Graphics Lab Motion Capture Database. http://mocap.cs.cmu.edu/.

[CO18] CASAS D., OTADUY M. A.: Learning nonlinear soft-tissue dynamics for interactive avatars. Proceedings of the ACM on Computer Graphics and Interactive Techniques 1,1 (May 2018).

[CVMG*14] CHO K., VAN MERRIENBOER B., GULCEHRE C., BAH-DANAU D., BOUGARES F., SCHWENK H., BENGIO Y.: Learning phrase representations using RNN encoder-decoder for statistical machine translation.

[dASTH10] DE AGUIAR E., SIGAL L., TREUILLE A., HODGINS J. K.: Stable spaces for real-time clothing. ACM Transactions on Graphics 29,4 (July 2010), 106:1-106:9.

[FCS15] FENG A., CASAS D., SHAPIRO A.: Avatar reshaping and automatic rigging using a deformable model. In Proceedings of the 8th ACM SIGGRAPH Conference on Motion in Games (2015), pp. 57-64.

[FTP16] FRATARCANGELI M., TIBALDO V., PELLACINI F.: Vivace: A practical gauss-seidel method for stable soft body dynamics ACM Trans. Graph. 35,6 (November 2016), 214:1-214:9.

[GRH*12] GUAN P., REISS L., HIRSHBERG D. A., WEISS A., BLACK M. J.: DRAPE: DRessing Any PErson. ACM Transactions on Graphics 31, July (2012), Volume 31 Issue 4.

[HFE13] HILSMANN A., FECHTELER P., EISERT P.: Pose space image based rendering. In Computer Graphics Forum (2013), vol. 32, pp. 265-274.

[HSR13] HAUSWIESNER S., STRAKA M., REITMAYR G.: Virtual try-on through image-based rendering. IEEE Transactions on Visualization and Computer Graphics (TVCG) 19, 9 (2013), 1552-1565.

[HTC*14] HAHN F., THOMASZEWSKI B., COROS S., SUMNER R. W., COLE F., MEYER M., DEROSE T., GROSS M.: Subspace Clothing Simulation Using Adaptive Bases. ACM Transactions on Graphics 33, 4 (July 2014), 105:1-105:9.

[HWW*18] HAN X., WU Z., WU Z., YU R., DAVIS L. S.: VITON: An image-based virtual try-on network. In Proceedings of IEEE Conference on Computer Vision and Pattern Recognition (CVPR) (2018).

[JF03] JAMES D. L., FATAHALIAN K.: Precomputing Interactive Dynamic Deformable Scenes. ACM Transactions on Graphics (Proc. SIGGRAPH) 22, 3 (July 2003), 879-887.

[JTST10] JAIN A., THORMAHLEN T., SEIDEL H.-P., THEOBALT C.: MovieReshape: Tracking and Reshaping of Humans in Videos. ACM Transactions on Graphics (Proc. SIGGRAPH Asia 2010) 29, 5 (2010).

[KGBS11] KAVAN L., GERSZEWSKI D., BARGTEIL A. W., SLOAN P.-P.: Physics-inspired upsampling for cloth simulation in games. ACM Transactions on Graphics 30, 4 (2011)

[KJM08] KALDOR J. M., JAMES D. L., MARSCHNER S.: Simulating knitted cloth at the yarn level. ACM Trans. Graph. 27, 3 (2008), 65:1-65:9.

[KKN*13] KIM D., KOH W., NARAIN R., FATAHALIAN K., TREUILLE A., O'BRIEN J. F.: Nearexhaustive precomputation of secondary cloth effects. ACM Transactions on Graphics 32, 4 (2013)

[KV08] KIM T.-Y., VENDROVSKY E.: Drivenshape: a data-driven approach for shape deformation. In Proceedings of the 2008 ACM SIG-GRAPH/Eurographics Symposium on Computer Animation (2008), Eurographics Association, pp. 49-55.

[LCF00] LEWIS J. P., CORDNER M., FONG N.: Pose space deformation: a unified approach to shape interpolation and skeleton-driven deformation. In Annual Conference on Computer Graphics and Interactive Techniques (2000), pp. 165-172.

[LCT18] LAHNER Z., CREMERS D., TUNG T.: Deepwrinkles: Accurate and realistic clothing modeling. In European Conference on Computer Vision (ECCV) (2018).

[LMR*15] LOPER M., MAHMOOD N., ROMERO J., PONS-MOLL G., BLACK M. J.: SMPL: A skinned multiperson linear model. ACM Transactions on Graphics (Proc. SIGGRAPH Asia) 34,6 (October 2015), 248:1-248:16.

[MBR17] MARTINEZ J., BLACK M. J., ROMERO J.: On human motion prediction using recurrent neural networks. In 2017 IEEE Conference on Computer Vision and Pattern Recognition (CVPR) (2017), IEEE, pp. 4674-4683.

[NH13] NEOPHYTOU A., HILTON A.: Shape and pose space deformation for subject specific animation. In 3DV (2013), pp. 334-341.

[NPO13] NARAIN R., PFAFF T., O'BRIEN J. F.: Folding and crumpling adaptive sheets. ACM Transactions on Graphics 32,4 (July 2013), 51:1-51:8.

[NSO12] NARAIN R., SAMII A., O'BRIEN J. F.: Adaptive anisotropic remeshing for cloth simulation. ACM Transactions on Graphics 31,6 (November 2012), 152:1-152:10.

[OBLN17] OVERBY M., BROWN G. E., LI J., NARAIN R.: ADMM Projective Dynamics: Fast Simulation of Hyperelastic Models with Dynamic Constraints. IEEE Transactions on Visualization and Computer Graphics 23,10 (October 2017), 2222-2234.

[OLL18] OH Y. J., LEE T. M., LEE I.-K.: Hierarchical cloth simulation using deep neural networks. In Proceedings of Computer Graphics International 2018 (2018), CGI 2018, pp. 139-146.

[PMB13] PASCANU R., MIKOLOV T., BENGIO Y.: On the difficulty of training recurrent neural networks. In International Conference on Machine Learning (ICML) (2013), pp. 1310-1318.

[PMPHB17] PONS-MOLL G., PUJADES S., HU S., BLACK M.: Cloth-Cap: Seamless 4D Clothing Capture and Retargeting. ACM Transactions on Graphics, (Proc. SIGGRAPH) 36,4 (2017).

[RPC*10] ROHMER D., POPA T., CANI M.-P., HAHMANN S., SHEFFER A.: Animation wrinkling: augmenting coarse cloth simulations with realistic-looking wrinkles. In ACM Transactions on Graphics (TOG) (2010), vol. 29, ACM, p. 157.

[SM06] SCHOLZ V., MAGNOR M.: Texture replacement of garments in monocular video sequences. In Eurographics Conference on Rendering Techniques (2006), pp. 305-312.

[SRIC01] SLOAN P.-P. J., ROSE III C. F., COHEN M. F.: Shape by example. In Proceedings of Symposium on Interactive 3D graphics (2001), ACM, pp. 135-143.

[SSIF09] SELLE A., SU J., IRVING G., FEDKIW R.: Robust high-resolution cloth using parallelism, historybased collisions, and accurate friction. IEEE Transactions on Visualization and Computer Graphics 15, 2 (March 2009), 339-350.

[TWL*18] TANG M., WANG T., LIU Z., TONG R., MANOCHA D.: I-Cloth: Incremental collision handling for GPU-based interactive cloth simulation. ACM Transaction on Graphics (Proceedings of SIGGRAPH Asia) 37, 6 (November 2018), 204:1-10.

[VRM*17] VAROL G., ROMERO J., MARTIN X., MAHMOOD N., BLACK M. J., LAPTEV I., SCHMID C.: Learning from synthetic humans. In Conference on Computer Vision and Pattern Recognition (2017).

[WHRO10] WANG H., HECHT F., RAMAMOORTHI R., O'BRIEN J.: Example-based wrinkle synthesis for clothing animation. ACM Transactions on Graphics 29, 4 (2010)

[WPLS18] WEIDNER N. J., PIDDINGTON K., LEVIN D. I. W., SUEDA S.: Eulerian-on-lagrangian cloth simulation. ACM Transactions on Graphines 37, 4 (2018), 50:1-50:11.

[WRO11] WANG H., RAMAMOORTHI R., O'BRIEN J. F.: Data-driven elastic models for cloth: Modeling and measurement. ACM Transactions on Graphics (Proc. SIGGRAPH) 30, 4 (July 2011), 71:1-11.

[XUC*14] XU W., UMENTANI N., CHAO Q., MAO J., JIN X., TONG X.: Sensitivity-optimized Rigging for Example-based Real-time Clothing Synthesis. ACM Transactions on Graphics 33, 4 (July 2014), 107:1-107:11.

[YFHWW18] YANG J., FRANCO J.-S., HETROYWHEELER F., WUHRER S.: Analyzing Clothing Layer Deformation Statistics of 3D Human Motions. In European Conference on Computer Vision (ECCV) (September 2018).

[ZBO13] ZURDO J. S., BRITO J. P., OTADUY M. A.: Animating wrinkles by example on non-skinned cloth. IEEE Transactions on Visualization and Computer Graphics 19, 1 (2013), 149-158.

[ZPBPM17] ZHANG C., PUJADES S., BLACK M. J., PONS-MOLL G.: Detailed, Accurate, Human Shape Estimation From Clothed 3D Scan Sequences. In The IEEE Conference on Computer Vision and Pattern Recognition (CVPR) (July 2017).

[ZSZ*12] ZHOU Z., SHU B., ZHUO S., DENG X., TAN P., LIN S.: Image-based clothes animation for virtual fitting. In SIGGRAPH Asia 2012 Technical Briefs (2012), ACM, p. 33.

The invention claimed is:

1. A computer-implemented method for generating a digital representation of clothing on a body, the body modeled by a body template mesh having body parameters, including a shape parameter and a pose parameter, the method comprising the steps of:
   obtaining a clothing template mesh for the clothing, the clothing template mesh including a set of vertices and a garment parameter associated with a given size;
   subjecting the clothing template mesh to a non-linear regressor trained on a plurality of examples of deformations in training garment models due to a plurality of training body model parameters, the plurality of training body model parameters including a plurality of shape parameters and a plurality of pose parameters, the non-linear regressor configured to obtain deformations to the set of vertices of the clothing template mesh based, at least in part, on the body parameters of the body template mesh; and
   providing an output garment mesh of the clothing reflecting the deformations of the clothing in the given size by the body.

2. The computer-implemented method of claim 1, wherein the deformations correspond to a fit of the clothing on the body based on at least the shape parameter of the body template mesh.

3. The computer-implemented method of claim 2, further comprising:
   subjecting the clothing template mesh to a second non-linear regressor trained on a plurality of examples of wrinkle-based deformations in the training garment models due to the plurality of training body model parameters, the second linear regressor configured to obtain second deformations to the vertices of the clothing template mesh based on a body shape and the pose parameter of the body template mesh, wherein the second deformations correspond to wrinkles in the clothing based on a body pose and the shape parameter of the body template mesh.

4. The computer-implemented method of claim 1 wherein the non-linear regressor is implemented based on a single-hidden-layer multilayer perception (MLP) neural network.

5. The computer-implemented method of claim 1, wherein the deformations correspond to wrinkles in the clothing based on at least a body pose and the shape parameter of the body template mesh.

6. The computer-implemented method of claim 5, wherein the non-linear regressor is implemented based on a Recurrent Neural Network (RNN).

7. The computer-implemented method of claim 1, further comprising training the linear regressor with the plurality of examples of deformations in training garment models due to the plurality of training body model parameters, the linear regressor configured to encode a space model of variability in the clothing template mesh due to changes of at least body parameters.

8. The computer-implemented method of claim 7, wherein the variability in the clothing template mesh represent at least one of fit of the clothing on the body and wrinkles in the clothing due to the body.

9. A computer-implemented method for simulating clothing on a skeletal model, the method comprising:
   learning a body-shape based cloth deformation space model for a template clothing mesh from a first three-dimensional example data set of cloth mesh instances, said learnt cloth deformation space model encoding variability in said template cloth mesh based at least on changes in body shape;
   receiving as input a computer-based skeletal model defining a body shape and a pose and a computer model of an item of clothing, the computer model of the item of clothing defining a size of the item of clothing;
   computing an unposed cloth mesh representing the item of clothing fitted on the body shape defined by the computer-based skeletal model, the unposed cloth mesh preserving the size of the item of clothing; and
   generating a three-dimensional surface of the item of clothing in the size fitted on the body based on the unposed cloth mesh using a non-linear regressor trained on a plurality of examples including a plurality of shape parameters and a plurality of pose parameters.

10. The computer-implemented method of claim 9, wherein the computing the unposed cloth mesh comprises performing a non-linear regression of the computer model of the item of clothing based on learned instances of prior fitted unposed cloth meshes for a plurality of different training body shapes.

11. The computer-implemented method of claim 9, wherein the computing the unposed cloth mesh is based on a non-linear regressor implemented with a single-hidden-layer multilayer perception (MLP) neural network.

12. A computer-implemented method for simulating clothing on a skeletal model, the method comprising:
   receiving as input a computer-based skeletal model defining a body shape and a pose and one or more computer models of clothing items;
   computing an unposed cloth mesh for a given size of the clothing based on a non-linear regression based on learnt samples, the unposed cloth mesh fitting the one or more computer models of the clothing items to the body shape defined by the computer-based skeletal model;
   computing simulated garment wrinkles deformations based on the body shape and the pose defined by the computer-based skeletal model; and
   applying the computed garment wrinkles onto the unposed cloth mesh to generate a posed output cloth mesh in the give size of the clothing.

13. The computer-implemented method of claim 12, wherein the computing the simulated garment wrinkles deformations is based on a non-linear regressor implemented with a Recurrent Neural Network (RNN).

14. A system for generating a digital representation of clothing on a body, the body modeled by a body template mesh having body parameters, including a shape parameter and a pose parameter, the system comprising a processor and non-transitory computer readable media comprising instructions that when executed by the processor configures the processor to:

obtain a clothing template mesh for the clothing, the clothing template mesh including a set of vertices and a garment parameter associated with a given size;

subject the clothing template mesh to a non-linear regressor trained on a plurality of examples of deformations in training garment models due to a plurality of training body model parameters, the plurality of training body model parameters including a plurality of shape parameters and a plurality of pose parameters, the non-linear regressor configured to obtain deformations to the vertices of the clothing template mesh based, at least in part, on the body parameters of the body template mesh; and provide an output garment mesh of the clothing reflecting the deformations of the clothing in the given size by the body.

15. The system of claim 14, wherein the deformations correspond to a fit of the clothing on the body based on at least the shape parameter of the body template mesh.

16. The system of claim 14, wherein the non-linear regressor is implemented based on a single-hidden-layer multilayer perception (MLP) neural network.

17. The system of claim 14, wherein the deformations correspond to wrinkles in the clothing based on at least a body pose and the shape parameter of the body template mesh.

18. The system of claim 17, wherein the non-linear regressor is implemented based on a Recurrent Neural Network (RNN).

19. The system of claim 14, wherein the computer readable media further comprises instructions that when executed by the processor configures the processor to:

subject the clothing template mesh to a second non-linear regressor trained on a plurality of examples of wrinkle-based deformations in the training garment models due to the plurality of training body model parameters, the second linear regressor configured to obtain second deformations to the vertices of the clothing template mesh based on a body shape and the pose parameter of the body template mesh, wherein the second deformations correspond to wrinkles in the clothing based on a body pose and the shape parameter of the body template mesh.

20. The system of claim 14, wherein the computer readable media further comprises instructions that when executed by the processor configures the processor to train the linear regressor with the plurality of examples of deformations in training garment models due to the plurality of training body model parameters, the linear regressor configured to encode a space model of variability in the clothing template mesh due to changes of at least body shape parameters.

21. The system of claim 20, wherein the variability in the clothing template mesh represent at least one of fit of the clothing on the body and wrinkles in the clothing due to the body.

22. The system of claim 14, wherein the processor is a distributed processor including a plurality of processing units communicatively coupled via a computer network.

23. A computer implemented method for obtaining a digital representation of clothing on a body, the body modeled by a body template mesh having body shape parameters, including a shape and a pose, the method comprising:

providing an input comprising a clothing template mesh for the clothing, the clothing template mesh including a set of vertices and a garment parameter associated with a given size; and receiving by a virtual try-on application an output garment mesh of the clothing reflecting deformations of the clothing in the given size by the body, wherein the output garment mesh of the clothing reflecting the deformations is generated by subjecting the clothing template mesh to a non-linear regressor trained on a plurality of examples of deformations in training garment models due to a plurality of training body model parameters, the plurality of training body model parameters including a plurality of shape parameters and a plurality of pose parameters, the non-linear regressor configured to obtain the deformations to the set of vertices of the clothing template mesh based, at least in part, on the shape parameters of the body template mesh.

24. The method of claim 23, wherein the input comprises a size of the clothing.

25. The method of claim 23, wherein the input comprises a design of the garment.

26. The method of claim 23, wherein the deformations correspond to a fit of the clothing on the body based on the body parameters of the body template mesh.

27. The method of claim 23, wherein the deformations correspond to wrinkles in the clothing based on the pose and the shape of the body parameters of the body template mesh.

28. The method of claim 23, wherein the non-linear regressor is implemented based on a single-hidden-layer multilayer perception (MLP) neural network.

29. The method of claim 23, wherein the non-linear regressor is implemented based on a Recurrent Neural Network (RNN).

* * * * *